July 21, 1964

W. A. FURBER 3,141,695

LIFTING DEVICE

Filed June 26, 1961

Inventor
William A. Furber
By Cushman, Darby & Cushman
Attorneys

July 21, 1964  W. A. FURBER  3,141,695
LIFTING DEVICE

Filed June 26, 1961  4 Sheets-Sheet 2

Inventor
William A. Furber
By Cushman, Darby & Cushman
Attorneys

July 21, 1964   W. A. FURBER   3,141,695
LIFTING DEVICE

Filed June 26, 1961   4 Sheets-Sheet 3

Inventor
William A. Furber
By Cushman, Darby & Cushman
Attorneys

July 21, 1964 W. A. FURBER 3,141,695
LIFTING DEVICE
Filed June 26, 1961 4 Sheets—Sheet 4
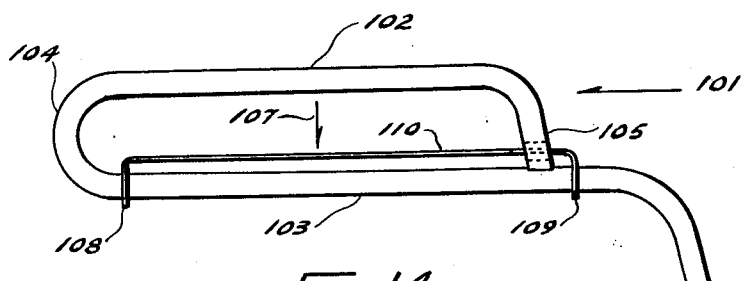
Fig. 14
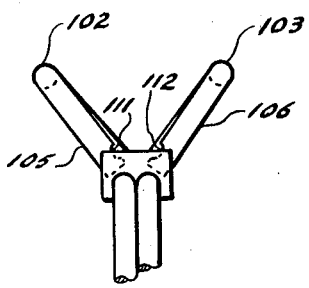
Fig. 15
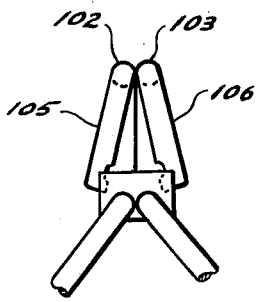
Fig. 16
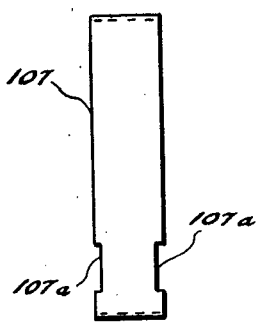
Fig. 17
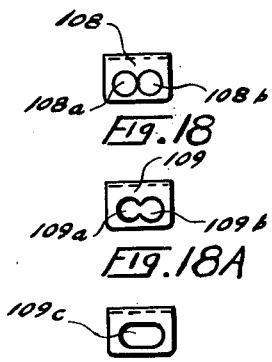
Fig. 18
Fig. 18A
Fig. 18B
Inventor
William A. Furber
By Cushman, Darby & Cushman
Attorneys 3,141,695
LIFTING DEVICE
William A. Furber, Caroline St., Lakefield, Ontario, Canada
Filed June 26, 1961, Ser. No. 119,418
7 Claims. (Cl. 294—16)

The present invention relates to lifting devices such as forks having adjustable tines or fingers.

It is an object of the present invention to provide lifting devices for small or relatively small objects.

It is a further object of the invention to provide lifting devices such as forks that may be inserted into areas of high temperature such as ovens for the purpose of removing cooked objects such as roasts, cakes, pies, bread and so on.

Additional objects will become apparent from the following description based on the accompanying drawings in which.

Figure 1:
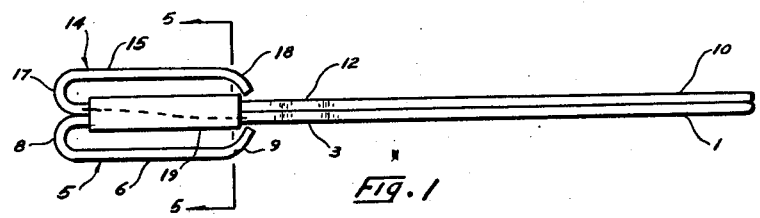
FIGURE 1 is a plan view of a lifting device according to the invention, the fingers, tines or lifting arms being shown at rest or in closed position.
Figure 3:
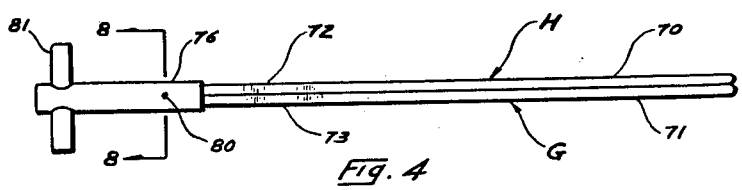
Figure 10:
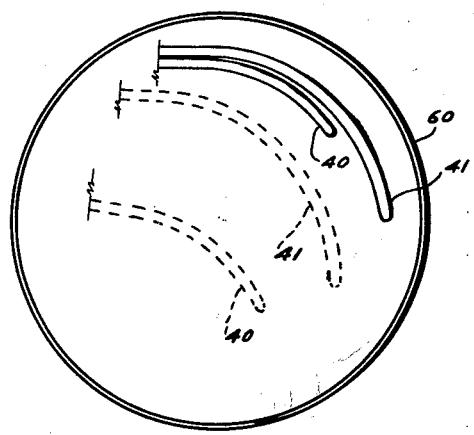
Figure 11:
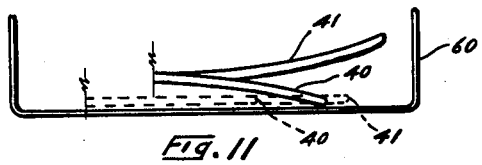
Figure 12:
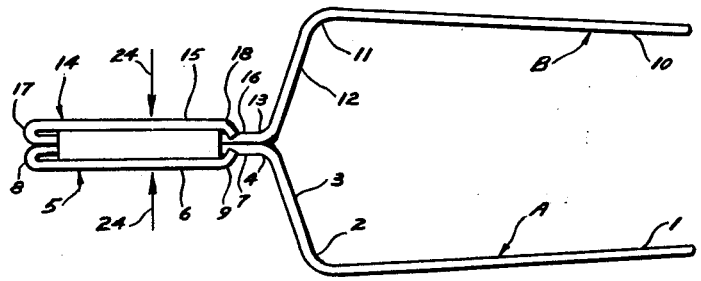
Figure 13:
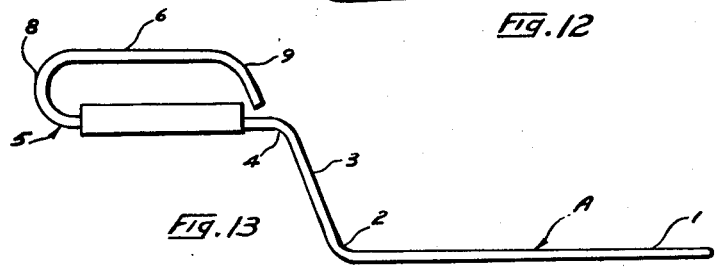

FIGURE 10 includes a section of a cooking utensil with the tines or lifting arms of the device of FIGURE 3 disposed near the bottom of the utensil, the full lines representing the closed position and the dotted lines the open position;

FIGURE 11 is a side view of FIGURE 10;

FIGURE 12 is a plan view of the device of FIGURE 1 in open position;

FIGURE 13 is a side view of the device of FIGURE 1.

A further embodiment of the invention is shown in the supplementary drawings in which:

FIGURE 14 is a side view of the handle member;

FIGURE 15 is an end view of the handle when the device is in closed position,

FIGURE 16 is an end view of the handle when the device is in open position and

FIGURE 17 is a plan view of the bracket;

FIGURES 18, 18A and 18B represent end views of the bracket or saddle member showing varieties of apertures.

Referring now to the drawings and in particular to FIGURES 1, 12 and 13 it will be seen that the device comprises two heavy wire members or rods A and B, member A having a free-ended, horizontally-disposed tine, finger or lifting arm 1 extending from bend 2 into a slanted or sloped article-supporting portion or shaft section 3 which in turn extends from bend 4 into looped handle member 5. The handle member has horizontally-disposed, generally parallel portions 6 and 7 and curved end portions 8 and 9.

Wire member B is identical with but is actually a mirror image of member A and has tine, finger or lifting arm 10, is bent at 11 to form sloped or slanted article-supporting portion 12, bent again at 13 to form looped handle member 14. The handle member 14 comprises parallel portions 15 and 16 and curved end portions 17 and 18.

In other words as between the two wire members A and B parts 1 to 9 in A correspond respectively to parts 10 to 18 in B.

Handle portions 7 and 16 are rotatably mounted within a sleeve or collar 19, and in rotation the two portions pivot or bear on each other and on the inner surface of the collar 19. A spring 20 is secured to portion 7 at 21 and to portion 16 at 22 and normally urges the members of the device from the open or operating position (FIGURE 12) to the at-rest or non-operating position (FIGURE 1). The spring 20 has been shown as a single straight length of wire spring but could obviously be a coiled spring coiled about either or both of the members 7 and 16. The spring may be regarded as a torsion bar spring and as being not only the activating source but also a very important assembly medium which keeps each member of the assembly in permanent position.

It will be noted that there is approximately a 90° divergence between parts 6, 8 and 9 of the one handle member 5 with respect to parts 15, 17 and 18 of handle member 14 and that parts 7 and 16 of the handle are held in constant pivotal contact relation by collar 19. In other words by virtue of being firmly encased within the collar 19 parts 7 and 16 constitute the fulcrums on which the handle members pivot.

Figure 5:
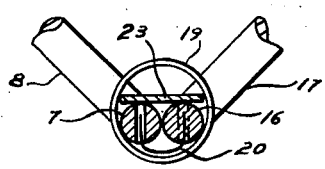
FIGURE 5 is a section on the line 5—5 in FIGURE 1.

If desired a wedge 23 may be inserted within the collar 19 above parts 7 and 16, as shown in FIGURE 5.

Figure 6:
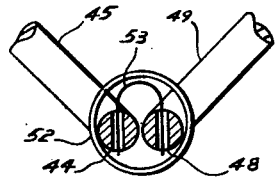
FIGURE 6 is a section on the line 6—6 in FIGURE 3.
Figure 7:
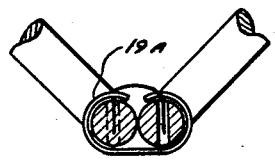
FIGURE 7 is a sectional view showing a modified collar.

While collar 19 has been shown circular in cross-section the use of an elliptical collar 19a (FIGURE 7) would serve the same purpose and is within the scope of the invention. Collar 19a has been shown in cross-section and represents a collar having a full-length open slot. As in FIGURES 5 and 6 however the sleeve or collar may comprise a closed slot or may be of unitary tubular construction.

To operate the device it is merely necessary to grasp handle members 5 and 14 in one hand and squeeze them and since they are pressure-responsive in the direction of the arrows 24 (FIGURE 12) they converge and at the same time cause fulcrum members 7 and 16 to roll or pivot on each other, whereupon tines or lifting members 1 and 10 diverge to form a supporting structure for an article to be lifted such as a cake-tin or bread-pan or the like that one may desire to remove from an oven, the tines sliding easily between the rods of the oven-rack and beneath the article in question. The operator then tilts the device with its supported article slightly upwardly so that the article slides gently back against supports 3 and 12. The article may then be moved safety to a place of deposit.

Figure 2:
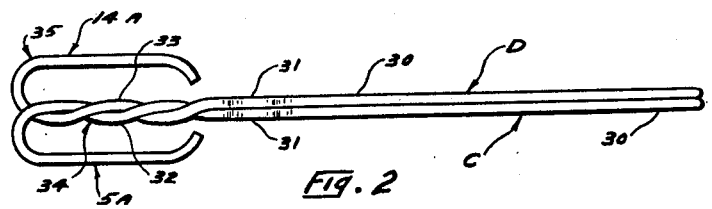
FIGURES 2, 3 and 4 are views similar to that in FIGURE 1 of alternative embodiments of the device.
Figure 4:
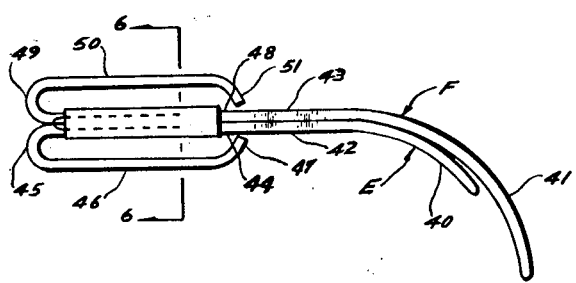

A modification of the invention is shown in FIGURES 2, 3 and 4.

In FIGURE 2 lifting arms 30 and article-supports 31 are formed from rods C and D but instead of being looped the handle-forming sections at the ends 32 and 33 of the rods C and D are twisted together to form concentric spirals as at 34 and rotatably secured together to form composite handle member 35.

To operate the device shown in FIGURE 2 it is merely necessary to squeeze handle members 5A and 14A, the operation being essentially the same as that for the device as shown in FIGURE 1.

A further modification of the invention is shown in FIGURES 3, 10 and 11. The article-supporting members and handle structure are essentially identical with those of the structure shown in FIGURE 1, the modification being apparent in the lifting arms.

The device shown in FIGURES 3, 10 and 11 includes wire members or rods E and F comprising tines or lifting arms 40 and 41, article-supports 42 and 43 and handle-forming portions 44, 45, 46 and 47 on rod E and 48, 49, 50, and 51 on rod F. Handle portions 44 and 48 are secured within collar 52. Spring 53 is secured to members 44 and 48 and serves to urge them from the open to the at-rest position (see FIGURE 6 and FIGURE 10).

Arm 40 is shorter than arm 41 and is bent downwardly slightly from the horizontal whereas arm 41 is bent upwardly slightly. As a result of the fact that they are bent the arms diverge in a vertical direction when the device is in that at-rest position as shown in solid lines in FIGURE 11.

In addition to being bent the arms 40 and 41 are curved, the curvatures being essentially concentric when viewed in plan as in FIGURE 3.

As with arms 1 and 10 in FIGURE 1, arms 40 and 41 are bent approximately at right angles to article-supports 42 and 43.

The device of FIGURE 3 is particularly well-adapted to the removal of articles from cooking-utensils, especially top-of-stove utensils. The device is inserted into a cooking pot 60, being kept to one side, until the lifting arms touch bottom. Squeezing pressure on the handle members 46 and 50 separates lifting arms 40 and 41 so that they assume the open position as shown in dotted lines in FIGURES 10 and 11, and when in open position they occupy the same horizontal plane since arm 40 tends to move relatively farther to the left than arm 41 and in so moving inscribes a greater arc thereby advancing to the same horizontal plane as that occupied by arm 41, whereupon the two arms form the necessary supporting structure for an article to be lifted such as a pot roast, large chunks of cooked vegetable, steamed pudding or etc.

Figure 8:
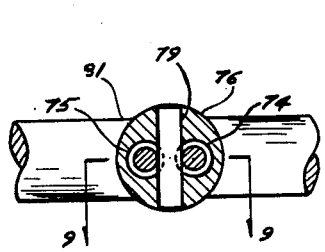
FIGURE 8 is an enlarged section on the line 8—8 in FIGURE 4.
Figure 9:
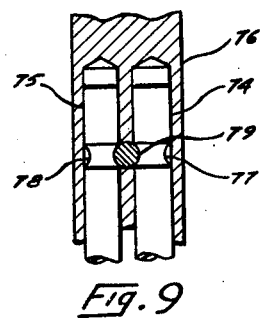
FIGURE 9 is an enlarged partial sectional view on the line 9—9 in FIGURE 8.
Figure 1A:
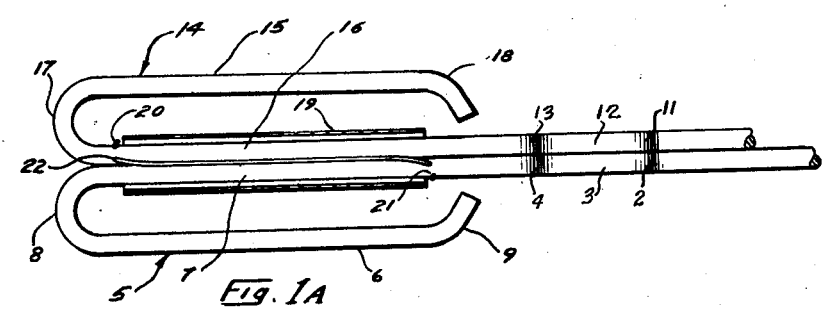
FIGURE 1A is a plan view of the handle members, partly in section.

FIGURE 4 along with FIGURES 8 and 9 represents a still further modification of the invention. Rods G and H comprise tines or lifting arms 70 and 71 and article-supports 72 and 73 which correspond to parts of the same name in FIGURES 1, 2, and 3 but the handle structure differs from that shown in other embodiments. Handle inserts 74 and 75 extend into a hollow tubular handle member 76, the inserts being unitary with rods H and G respectively. Insert 74 has a peripheral groove 77 and insert 75 has a corresponding groove 78, the two grooves together forming a slot designed to accommodate pin 79 inserted through aperture 80 in handle member 76. The pin in length may be equal to or slightly less than the inner diameter of handle member 76. Crosspiece 81 is mounted in member 76 at right angles thereto and completes the handle structure.

To operate the structure shown in FIGURES 4, 8 and 9 it is merely necessary to grasp handle member 76 in one hand and to twist or rotate crosspiece 81 with the other whereupon insert 75 is caused to rotate in a clockwise direction—see FIGURES 8 and 9—while riding on pin 79, thereby causing arm 71 to diverge from arm 70 thus forming a supporting structure similar to that formed by arms 1 and 10 in FIGURE 12.

A further embodiment of the invention may be seen in FIGURES 14 to 18.

The handle indicated generally at 101 is formed by bending the wire members to form parallel horizontally-disposed portions 102 and 103, curved rear portions 104 and forward portions 105 and 106. A securing member such as saddle member or bracket 107 is mounted on members 103, the bracket consisting of a strip of metal or plastic having end portions 108 and 109 bent at right angles to the main portion 110 of the bracket the portions 108 and 109 each being provided with paired holes or apertures 108a, 109a, 108b and 109b, or preferably a single oval aperture 109c, through which may pass members 103.

Forward members 105 and 106 of the handle have free ends, 105 being notched at 111 and 106 being notched at 112, the notches being designed to engage the sides of bracket 107, the bracket in turn having notches 107a. The notches 111 and 112 engage or are engageable with notches 107a, which latter notches perform the function of locating and securing the position of the handles in the assembly.

The width of bracket 107 is such that members 105 and 106 must be distorted slightly in order that the notches 111 and 112 may engage notches 107a in the bracket. That is to say, members 105 and 106 must be bent outwardly slightly to an off-parallel position in order to engage notches 107a of the bracket.

The outward bending of members 102–105 and 103–106 is sufficient to tension the handle members and converts each of them to a torsion bar or spring, sufficiently strong to be constantly urging the device to the at-rest or closed position.

In the foregoing description the tines or fingers have been assumed to be of circular cross-section but it is within the scope of the invention to use tines of any desired shape in cross-section, for example, square, flat, elliptical, triangular, half-round, etc.

It is also within the scope of the invention to adapt the device for use in either the right or the left hand, particularly in the case of the structures with curved tines.

While the devices according to the invention have been described in terms of household uses, it should not be overlooked that the basic design is capable of being adapted to heavy-duty industrial uses. For industrial application the entire structure of the device would have to be enlarged several times and the opening and closing of the lifting arms would be accomplished mechanically rather than by hand. Nevertheless the inventive idea remains the same and the adapting of the present structures to the needs of the warehouse, the farm, civic engineering departments, and so on would be a relatively simple matter.

Many hazards of the home become safe, simple operations when the housewife has the assistance of the present invention. The removal of cooked roasts and fowl from roasting pans and cooking vessels, the removal of baked cakes, pies, cookies, and biscuits from the oven, the lifting of cooked potatoes and chunks of leafy vegetables from pressure cookers and other top-of-stove utensils, the removal of laundry and dyed articles from hot liquids, are among the many domestic operations that will be facilitated by the use of the remarkable device described above.

The embodiments of the invention in which an exclusive property or privilege is claimed are defined as follows:

1. A lifting device comprising: paired unitary rod-like members disposed in parallel side-by-side relation over a portion of their length when said device is in closed position, each of said members comprising a lifting section and a handle-section, said sections being oppositely disposed in generally parallel spaced-apart horizontal planes and being united by a shaft section disposed in a plane that intersects said horizontal planes approximately at right angles thereto; parts of said handle-sections being divergently disposed when said device is closed; other parts of said handle-sections being held in constant pivotal relationship by and within a securing member both when said device is closed and when it is open, springs in said handle-sections normally urging the device to the closed position, said handle-sections being free-ended, said securing member being a bracket with angularly-disposed, apertured end-portions formed integral therewith, portions of said handle-sections extending through said apertures, the free end of said handle-sections being releasably secured to said bracket.

2. A lifting device comprising: paired unitary rod-like members disposed in parallel side-by-side relation over a portion of their length when said device is in closed position, each of said members comprising a lifting section and a handle-section, said sections being oppositely disposed in generally parallel spaced-apart horizontal planes and being united by a shaft section disposed in a plane that intersects said horizontal planes approximately at right angles thereto; parts of said handle-sections being divergently disposed when said device is closed; other parts of said handle-sections being held in constant pivotal relationship by and within a securing member both when said device is closed and when it is open, springs in said handle-sections normally urging the device to the closed position, said lifting sections being curved and of different lengths, the curvatures being approximately concentric when the device is in the closed position, the ends of said sections diverging slightly in a vertical direction when said device is closed and being in the same horizontal plane when said device is open.

3. A lifting device comprising: paired unitary rod-like members disposed in parallel side-by-side relation over a portion of their length when said device is in closed position, each of said members comprising a lifting section and a handle-section, said sections being oppositely disposed in generally parallel spaced-apart horizontal planes and being united by a shaft section disposed in a plane that intersects said horizontal planes approximately at right angles thereto; parts of said handle-sections being divergently disposed when said device is closed; other parts of said handle-sections being held in constant pivotal relationship by and within a securing member both when said device is closed and when it is open, springs in said handle-sections normally urging the device to the closed position, said handle-sections being free-ended, said securing member being a bracket with angularly-disposed, apertured end-portions formed integral therewith, portions of said handle-sections extending through said apertures, the free end of said handle-sections being releasably secured to said bracket, the free ends of said handle-sections being notched, the notches being adapted to engage said bracket, each handle-section in being spring-tensioned being twisted to an off-parallel position.

4. A lifting device comprising: paired unitary rod-like members disposed in parallel side-by-side relation over a portion of their length when said device is in closed position, each of said members comprising a lifting section and a handle-section, said sections being oppositely disposed in generally parallel spaced-apart horizontal planes and being united by a shaft section disposed in a plane that intersects said horizontal planes approximately at right angles thereto; parts of said handle-sections being divergently disposed when said device is closed; other parts of said handle-sections being held in constant pivotal relationship by and within a securing member both when said device is closed and when it is open, springs in said handle-sections normally urging the device to the closed position, said handle-sections being free-ended, said securing member being a bracket with angularly-disposed, apertured end-portions formed integral therewith, portions of said handle-sections extending through said apertures, the free end of said handle-sections being releasably secured to said bracket, the free ends of said handle-sections being notched, the notches being adapted to engage said bracket, each handle-section in being spring-tensioned being twisted to an off-parallel position, said bracket being provided with paired notches, said notches being positioned adjacent one of the ends of said bracket and being engageable with the notched ends of said handle-sections.

5. A lifting device comprising in combination: paired unitary rod-like members each bent to form a horizontally-disposed, free-ended lifting arm, a vertically-disposed article-supporting shaft and a looped handle section; said lifting arm and said handle section being disposed in spaced-apart parallel planes and being united by said shaft, said rod-like members being secured together by a securing member mounted over a portion of their length, the secured portions of said members being in pivotal contact and forming part of said handle-sections, other parts of said handle-sections being divergently disposed and pressure-responsive and, by virtue of said secured portions, rotatable in opposite directions to open said device whereby said lifting arms are caused to diverge thereby forming a supporting structure for an article to be lifted; said handle-sections being spring-tensioned, said handle-sections being free-ended, said securing member being a bracket with angularly-disposed, apertured end-portions formed integral therewith, portions of said handle-sections extending through said apertures, the free end of said handle-sections being releasably secured to said bracket.

6. A lifting device comprising in combination: paired unitary rod-like members each bent to form a horizontally-disposed, free-ended lifting arm, a vertically-disposed article-supporting shaft and a looped handle section; said lifting arm and said handle-section being disposed in spaced-apart parallel planes and being united by said shaft, said rod-like members being secured together by a securing member mounted over a portion of their length, the secured portions of said members being in pivotal contact and forming part of said handle-sections, other parts of said handle-section being divergently disposed and pressure-responsive and, by virtue of said secured portions, rotatable in opposite directions to open said device whereby said lifting arms are caused to diverge thereby forming a supporting structure for an article to be lifted; said handle-sections being spring-tensioned, said handle-sections being free-ended, said securing member being a bracket with angularly-disposed, apertured end-portions formed integral therewith, portions of said handle-sections extending through said apertures, the free end of said handle-sections being releasably secured to said bracket, the free ends of said handle-sections being notched, the notches being adapted to engage said bracket, each handle-section in being spring-tensioned being twisted to an off-parallel position.

7. A lifting device comprising in combination: paired unitary rod-like members each bent to form a horizontally-disposed, free-ended lifting arm, a vertically-disposed article-supporting shaft and a looped handle section; said lifting arm and said handle-section being disposed in spaced-apart parallel planes and being united by said shaft, said rod-like members being secured together by a securing member mounted over a portion of their length, the secured portions of said members being in pivotal contact and forming part of said handle-sections, other parts of said handle-sections being divergently disposed and pressure-responsive and, by virtue of said secured portions, rotatable in opposite directions to open said device whereby said lifting arms are caused to diverge thereby forming a supporting structure for an article to be lifted; said handle-sections being spring-tensioned, said handle-sections being free-ended, said securing member being a bracket with angularly-disposed, apertured end-portions formed integral therewith, portions of said handle-sections extending through said apertures, the free end of said handle-sections being releasably secured to said bracket, the free ends of said handle-sections being notched, the notches being adapted to engage said bracket, each handle-section in being spring-tensioned being twisted to an off-parallel position, said bracket being provided with paired notches, said notches being positioned adjacent one of the ends of said bracket and being engageable with the notched ends of said handle-sections.

References Cited in the file of this patent

UNITED STATES PATENTS

| | | |
|---|---|---|
| 703,192 | Gueth | June 24, 1902 |
| 1,239,615 | Mitchell | Sept. 11, 1917 |
| 1,902,685 | Baldwin | Mar. 21, 1933 |
| 2,127,947 | Weiss | Aug. 23, 1938 |
| 2,508,823 | Habeck | May 23, 1950 |

FOREIGN PATENTS

| | | |
|---|---|---|
| 330,905 | France | July 11, 1903 |